United States Patent [19]

Prochazka

[11] 3,954,483

[45] May 4, 1976

[54] DENSE POLYCRYSTALLINE SILICON CARBIDE

[75] Inventor: Svante Prochazka, Ballston Lake, N.Y.

[73] Assignee: General Electric Company, Schenectady, N.Y.

[22] Filed: Jan. 8, 1974

[21] Appl. No.: 431,729

[52] U.S. Cl. .................................. 106/44; 423/345
[51] Int. Cl.² .................. C04B 35/52; C04B 35/70
[58] Field of Search ............ 423/345, 439; 106/44; 29/182.7

[56] References Cited
UNITED STATES PATENTS

| | | | |
|---|---|---|---|
| 2,887,393 | 5/1959 | Taylor | 423/345 |
| 2,916,460 | 12/1959 | Van Der Beck | 106/44 |
| 3,409,402 | 11/1968 | Addamiano | 423/345 |
| 3,554,717 | 1/1971 | Shaffer et al. | 106/44 |
| 3,767,371 | 10/1973 | Wentorf et al. | 264/65 |

OTHER PUBLICATIONS

*Journal of Amer. Ceram. Soc.* — Vol. 39 No. 11 — pp. 386–389 Pressure Sintered S.C. — Alliegro et al.

*Primary Examiner*—Oscar R. Vertiz
*Assistant Examiner*—Eugene T. Wheelock
*Attorney, Agent, or Firm*—Jane M. Binkowski; Joseph T. Cohen; Jerome C. Squillaro

[57] ABSTRACT

A dense silicon carbide material having improved electrically conducting properties is disclosed which is prepared by forming a homogeneous dispersion of silicon carbide, a sufficient amount of boron nitride, and optionally a boron containing additive and hot pressing the dispersion at a sufficient temperature and pressure whereby a dense substantially nonporous ceramic is formed. The silicon carbide material can be machined by electrical discharge machining or by electrochemical machining.

7 Claims, No Drawings

DENSE POLYCRYSTALLINE SILICON CARBIDE

The invention herein described was made in the course of or under a contract or subcontract thereunder (or grant) with the Department of the Navy.

The chemical and physical properties of silicon carbide make it an excellent material for high temperature structural applications. These properties include good oxidation resistance and corrosion behavior, good heat transfer coefficients, low thermal expansion coefficient, high thermal shock resistance and high strength at elevated temperature. This unique combination of properties suggests the use of silicon carbide as components for gas turbines, check valves for handling corrosive liquids, linings of ball mills, heat exchangers and refractories for high temperature furnaces, pumps for die casting machines and combustion tubes.

Heretofore, hot pressing of silicon carbide was used to produce small specimens under closely controlled conditions. Unfortunately, silicon carbide is not easily sintered to densities approaching the theoretical density of 3.21 grams per cubic centimeter. A method of hot pressing silicon carbide to uniform densities on the order of 98% of the theoretical density with slight additions of aluminum and iron aiding in densification is disclosed by Alliegro et al., *J. Ceram. Soc.*, Vol. 39, II (November 1956), pages 386–389.

My copending application entitled HOT PRESSED SILICON CARBIDE, Ser. No. 317,426, filed Dec. 21, 1972, describes an improved method of making a dense silicon carbide ceramic by forming a homogeneous dispersion of a submicron powder of silicon carbide and a boron containing additive and hot pressing the dispersion at a temperature of about 1,900°–2,000° C. and at a pressure of about 5,000–10,000 psi for a sufficient time to produce a dense nonporous silicon carbide ceramic. The advantage of boron as a sintering aid, in comparison to other materials such as alumina, aluminum nitride and other metallic compounds, is that boron provides increased oxidation and corrosion resistance at elevated temperature.

Subsequently, Prochazka et al., in the copending application Ser. No. 378,918, filed July 13, 1973, disclosed a further improvement in hot pressing silicon carbide by incorporating a carbonaceous additive into the homogeneous dispersion of silicon carbide and boron containing additive powders. The addition of the carbon suppresses exaggerated grain growth in the microstructure of the dense silicon carbide ceramic product and yields improved strength properties. However, hot pressing yields excellent ceramic materials only in the form of billets having a simple geometric shape. The manufacture of more complex shapes is very difficult by conventional means because of the extreme hardness of silicon carbide which is somewhere between corundum and diamond.

Two special machining methods used for removal of metal are electrochemical machining (ECM) and electrical discharge machining (EDM). Electrochemical machining involves a chemical process which removes metal by breaking the molecular bonds and removes the metal, molecule by molecule, but at a very fast rate using a smooth DC current with the workpiece usually positive. Electrical discharge machining is concerned essentially with a intermittent process using pulses of DC current. The workpiece may be either positive or negative, but is usually negative. Erosion occurs as a result of the energy liberated during an electrical discharge between an electrode and the workpiece causes intense heating of the zone of impact of the discharge. The effect of this is to vaporize a certain volume of metal from the workpiece to be machined.

While these methods are relatively proven techniques for metals, they have not been extensively used as a material removal processes for ceramics. A consideration which make them attractive for the shaping of ceramics is that these processes are not dependent on the hardness of the workpiece. However, a limiting factor is that ECM and EDM are restricted to materials with reasonably good electrical conductivity. Germanium crystals having a resistance of 31 ohm cm have been cut using the EDM technique with low spark energies of $10^{-3}$ to $10^{-4}$ joule and resistivity much greater than this would, probably, substantially limit the cutting process. This requirement eliminates most of the conventional ceramic and vitreous materials and limits the application to conductive intermetallic compounds. Thus, heretofore, the EDM technique has not been practical for shaping hot-pressed silicon carbide.

In accordance with the present invention, I have discovered a high temperature, high strength silicon carbide ceramic material capable of being machined by electrical discharge machining technique. My invention includes a method of making an electrically conducting silicon carbide ceramic by forming a substantially homogeneous dispersion of a submicron powder of silicon carbide, 0.7–3.5% by weight of boron nitride and optionally up to 1% by weight of a boron containing compound selected from the group consisting of boron and boron carbide, and thereafter hot pressing the dispersion in an inert atmosphere at a temperature of about 1,950°–2,050° C. and at a pressure of about 5,000–10,000 psi for a sufficient time to produce a high density ceramic. The silicon carbide ceramic product has a maximum resistivity of about 50 ohm cm. The product obtained has a density of at least 98% of the theoretical density of SiC. It is suitable as an engineering material such as, for example, in high temperature gas turbine applications.

It is essential that the powder dispersion be a mixture of submicron particle sized powders in order to obtain the high densities and strengths upon hot pressing. These may be obtained by different techniques as, for example, by direct synthesis from the elements, by reduction of silica, or by pyrolysis of compounds containing silicon and carbon. The pyrolytic technique is particularly advantageous in that it yields a powder having a controlled particle size, a predetermined composition and is composed mainly of isolated crystallites. In this process methyltrichlorosilane vapor and hydrogen or a mixture of $SiCl_4$ vapor and a suitable hydrocarbon vapor, such as toluene, and hydrogen are introduced into an argon plasma generated between two concentric electrodes. In the hot plasma the compounds decompose into ions and the most stable molecules, i.e., SiC and HCl, form on cooling the gases. The SiC is formed as small crystals typically 0.1–0.3 $\mu$ in size. The advantage of this product is that the crystallites are not aggregated and that the carbon to silicon ratio can be controlled by monitoring the initial vapor composition so that the SiC powders slightly enriched in carbon can be obtained. Moreover, $BCl_3$ can be further added to the reactants in the desired amounts whereby the SiC powders are doped with boron which has been dispersed essentially on a molecular level if a hyperstoichiometric boron content over the ratio given by BN is required.

Another process for preparing silicon carbide powder with excellent sintering properties is disclosed by Prener in U.S. Pat. No. 3,085,863, entitled METHODS OF MAKING SILICON CARBIDE. The patent teaches a process of making pure silicon carbide which includes the steps of forming a silica gel in a sugar solution, dehydrating the gel to decompose the sugar and to form a finely divided mixture of silica and carbon, and heating the mixture.

The room temperature conductivity is induced by the substitution of nitrogen atoms for carbon atoms in the SiC lattice which act as electron donors, i.e. provide extra electrons easily excitable into the conduction band. Boron which is simultaneously introduced into SiC to enhance sintering, however, tends to suppress the room temperature conductivity since the boron atoms act as traps for the electrons supplied by the nitrogen atoms. To override the effect of boron, a relatively large amount of nitrogen is required, close to the N/B molar ratio of 1. Such heavy nitrogen doping cannot be obtained just by exposing the powder to nitrogen during the hot-pressing operation. It is, however, easily achieved when boron is introduced in the form of boron nitride. In this way, the sintering promoting effect of boron together with the nitrogen doping for conductivity are simultaneously provided by a single additive and moreover the boron to nitrogen ratio is ideally controlled. The conductivity obtained in SiC prepared by hot-pressing with the boron nitride addition is typically 0.5 to 1 reciprocal $\Omega$ cm. It is, however, sensitive to impurities such as Al, Fe, Si, O, etc. The quoted values were obtained with pure SiC powders containing less than 300 ppm metals and 600 ppm oxygen. On the other hand, the conductivity is fairly insensitive to the addition of BN as demonstrated by the following values obtained for resistance measurement at room temperature on 1 inch dia. discs 3/8 inch thick with painted on silver electrodes:

TABLE I

| BN addition % (weight) | Resistivity $\Omega$ cm | Conductivity mho/cm |
| --- | --- | --- |
| 1 | 1.5 | 0.66 |
| 2 | 3.0 | 0.33 |
| 2.3 | 0.7 | 1.5 |
| 3.5 | 2.0 | 0.5 |

As has been disclosed in my copending application Ser. No. 317,426, boron is a very effective sintering additive for SiC and additions above 0.3% by weight bring about densification to theoretical density on conventional hot pressing conditions, i.e. about 1,950° C. and 5 to 10 kpsi. Boron when added as boron nitride is somewhat less efficient which is reflected in lower final densities at identical hot-pressing conditions. Thus, typical final densities of specimens hot-pressed from SiC with an addition of BN in the temperature region 1,950°–2,000° C. are 3.15 to 3.18 g/cc corresponding to 98 to 99% of the theoretical. Increasing the amount of the BN addition or the hot-pressing temperature does not usually improve the final density while increasing the pressure is impractical. For the majority of the applications, the density on the order of 98 to 99% is quite satisfactory, When it is desirable, however, to eliminate the remaining one or two percent porosity in order to achieve the approximate theoretical densities, an addition of elemental boron or boron carbide in addition to boron nitride is most helpful. While an increase of the resistance occurs, nevertheless, conductivities high enough for machining are obtained. This is illustrated by the following data which lists the resistance and final densities of 2 inch dia. pressings ⅜ inch thick hot-pressed at 2,000° C. and 10 kpsi for 30 minutes.

TABLE II

| | Addition | Final Density g/cc | % | Resistivity $\Omega$ cm | Conductivity mho/cm |
| --- | --- | --- | --- | --- | --- |
| (1) | 2% BN | 3.16 | 98.5 | 3.0 | 0.33 |
| (2) | 2% BN+ 0.4% B | 3.20 | 99.7 | 27.0 | 0.037 |
| (3) | 1% BN+ 0.6% B | 3.20 | 99.7 | 65.0 | 0.015 |

The presence of nitrogen has an additional beneficial effect besides inducing conductivity in that it stabilizes the $\beta$ polytype, i.e. the cubic SiC form. On hot-pressing $\beta$-SiC powders with boron additions at 2,000° C. and above, the mass tends to transform into the $\alpha$-6H SiC polytype which is the thermodynamically more stable form. Once the $\alpha$-6SiC phase is nucleated, it grows into large tabular crystals up to several hundred microns long. This effect can be controlled only by hot-pressing at the lowest possible temperature which in turn requires high pressures or long pressing cycles. An addition of BN fully suppresses the $\beta$ to $\alpha$ transformation. Even after an 8-hour anneal at 2,000° C., a specimen of SiC hot-pressed at 2,000° C. did not show any transformation whatever and preserved a fine grained microstructure. A specimen hot-pressed with boron on the other hand transformed almost entirely into $\alpha$-6H SiC and grains grew by a factor of about 50. Thus, it may be appreciated that BN is a very desirable sintering addition, since it prevents grain coarsening not only during the hot-pressng cycle but also during exposure to very high temperature in use and thus enhances obtaining and preserving high strength.

The BN addition is most conveniently introduced by mixing the powders of SiC and BN in an amount of 0.7–3.5% by weight by ball milling. Also, jet-milling preceeded by premixing the powders is an effective technique. In ball milling, the wear of the balls may introduce contamination harmful to some properties and therefore the milling time and the proper selection of charge to ball ratio is important. For instance, on using alumina balls and the charge to ball ratio one to three, wear amounting 0.50% alumina per charge was introduced after 4 hours milling time and 1.15% after 8 hours of wet grinding.

Jet milling eliminates the problem of wear entirely and is therefore a better approach to the mixing of the powders. Other techniques of mixing which do not have a simultaneous grinding action can be applied to the powder mixture which are subjected to preliminary grinding.

There are several critical parameters during hot-pressing which control the densification and microstructure of the final product. The most important of these are pressure, temperature, and time at the temperature. While they will be discussed individually, it is readily apparent that these conditions are interdependent.

The pressure range useful for full densification is between about 5,000 to 10,000 psi. For general uses and for larger articles, the pressure is limited by available die materials and design. thus, for solid graphite dies, the upper limit is about 5,000 psi and for graphite fiber-wound dies the upper limit is about 10,000 psi. It is advantageous to use a pressure close to the upper limit of 10,000 psi because the application of high pressure makes it possible to keep the temperature low enough to control the grain growth. Low pressures below 5,000 psi, require the use of higher sintering temperatures or longer pressing time and generally yield lower end point densities. The first indication of densification on heating up is obtained at or slightly above 1,600° C. which may be detected by the motion of the press ram. However, for all practical purposes the required high density, above 99% of the theoretical, cannot be obtained below 1,950° C.

The additions of BN compared to boron retards densification somewhat of SiC powders so that increased temperatures of 50° to 100° C. higher are requires. At the same time, however, the tendency of the SiC grains to undergo exaggerated growth is suppressed, and increased temperature or extended time of the pressing cycle brings about only slow and uniform coarsening of the microstructure which gives excellent control over the grain size. For instance, on pressing 2-inch diameter disks ½ inch thick for 30 min. at 10,000 psi, a density of 98% of the theoretical was attained at 1,950° C. and 98.5% at 2,000° C. A 60 min. hold under these conditions brought only marginal improvements in density. In either case, metallographic examination revealed uniform equiaxed grain structures with an average grain size of 2.5 and 3.0 microns, respectively.

With an increased size of the specimen the time becomes an important parameter. For a 2-inch × ½ inch disk, the finite density of 98.5% was obtained in 30 minutes at 2,000° C. and 10,000 psi. On pressing a 3 × 1 inch disk at the same conditions, the density was 96.5%; however, an extended hold at the high temperature for 60 minutes increased the density to 98.0%, i.e., to essentially the same value as was obtained in the small specimen. Metallographic sections prepared from the central parts of the discs showed identical grain size.

During hot pressing an atmosphere must be used which is inert to silicon carbide under hot pressing conditions of temperature and pressure. Thus, oxidizing atmospheres such as air cannot be used since they would tend to oxidize the silicon carbide to silica, interfere with sintering and degrade the high temperature properties. Useful inert atmospheres as defined herein include argon, helium, and nitrogen.

My invention is further illustrated by the following examples:

EXAMPLE I

Boron nitride (98.2% pure) powder having a particle size of −2 μ was prepared by jet milling. A dry powder mixture was prepared by combining 200 g. of submicron sized β-SiC powder and 4.6 g. of boron nitride powder. The powder mixture was then added to 200 ml. of a 0.5 % aluminum stearate solution in benzene. The slurry was then tumbled in a plastic jar with cemented carbide balls for a period of five hours. Thereafter, the slurry was dried and the resulting powder was screened through a 40 mesh sieve.

The powder mixture was then charged in a 3-inch bore graphite die and hot pressed at a temperature of 2,000° C. and a pressure of 10,000 psi for 60 minutes. The pressing had a density of 3.16 g./cc., equivalent to 98.5% of the theoretical density. Further, evaluation of the product showed the following properties:

TABLE III

| | |
|---|---|
| Phase composition by x-ray analysis | β - SiC, no other phases detected |
| Grain size | 2.5 μ |
| Electrical conductivity | 1.5 recip ohm-cm. |
| Creep rate, strain in bending at 1550° C. and 30,000 psi | 4 × 10⁻⁹/sec. |
| Flexural strength, 25° C. | 69 kpsi |
| Flexural strength, 1500° C. | 77 kpsi |

EXAMPLE II

A β-silicon carbide powder was prepared by pyrolysis of methyltrichlorosilane and doped with 0.4 weight percent of boron. The powder was then mixed with 2 weight percent of boron nitride powder to form a homogeneous powder dispersion.

The powders were dispersed in benzene to form a thin slurry and stirred for 2 minutes in a liquid blender. After drying, the powder mixture was jet milled and 60 g. of the powder was charged into a 2-inch graphite die and hot-pressed at a temperature of 2,000° C. and a pressure of 10 Kpsi for a period of 30 minutes.

The density of the specimen determined by liquid displacement was 3.20 g./cc. The faces of the specimen were ground off and silver plated. The resistivity of the sample at 6 volts DC was found to be 27 ohms cm.

EXAMPLE III

The faces of a ⅜-inch thick plate having a 3 ohm cm. resistivity were coated by silver paint to suppress transient resistance between the work piece and the grips of the EDM apparatus. The workpiece was clamped in a vise, which was connected to the current source, and immersed in the electrolyte. The tool was ¼ inch square brass rod clamped in the chuck and connected to the other electrode. The tool was made the positive electrode though the reversed polarity could also be applied with no apparent effect on tool wear. After the arcing was commenced, the voltage was adjusted to 40V and maintained for the entire machining operation. Under these conditions, a rectangular hole was machined through the workpiece. The removal rate is, of course, dependent on the voltage-current conditions and may be adjusted in a wide range. Inspection of the surface of the workpiece indicated no damage such as thermal shock cracks.

It will be appreciated that the invention is not limited to the specific details shown in the examples and illustrations and that various modifications may be made within the ordinary skill in the art without departing from the spirit and scope of the invention.

I claim:

1. A Method of making a dense silicon carbide ceramic comprising the steps of
   a. forming a substantially homogeneous dispersion of a submicron powder of silicon carbide and 0.7–3.5% by weight of boron nitride, and
   b. hot pressing the dispersion in an inert atmosphere at a temperature of about 1,950°–2,050°C. and at a pressure of about 5,000–10,000 psi for a sufficient time to produce a ceramic product of at least 98% density.

2. The method of claim 1, wherein said time is about 10–60 minutes and the inert atmosphere is one selected from the group consisting of argon, helium and nitrogen.

3. The method of claim 2, wherein said homogeneous dispersion additionally contains up to 1% by weight of boron.

4. The method of claim 3, wherein the inert atmosphere is argon, the temperature is about 1,950°C., the pressure is about 10,000 psi and the time is about 30 minutes.

5. A dense silicon carbide ceramic consisting essentially of β-silicon carbide and 0.7–3.5% by weight of boron nitride, the ceramic being substantially pore free, having a density of at least 98% of the theoretical density for silicon carbide, and having a maximum resistivity of about 50 ohm centimeters.

6. The ceramic of claim 5, containing about 2% by weight of boron nitride and having a resistivity of about 3 ohm centimeters.

7. The ceramic of claim 5 in which the grain size is about 2.5 microns, the flexural strength at 25°C. is about 69,000 pounds per square inch and at 1500°C. is about 77,000 pounds per square inch, and the creep rate strain in bending at 1550°C. and 30,000 pounds per square inch is about $4 \times 10^{-9}$ per second.

* * * * *